United States Patent [19]

Herchenbach et al.

[11] 4,298,340
[45] Nov. 3, 1981

[54] METHOD AND APPARATUS FOR PRODUCING A HYDRAULIC BINDER

[75] Inventors: Horst Herchenbach, Troisdorf, Fed. Rep. of Germany; Bartl Lechner, Kufstein, Austria

[73] Assignee: Klöckner-Humboldt-Deutz AG, Fed. Rep. of Germany

[21] Appl. No.: 142,705

[22] Filed: Apr. 22, 1980

Related U.S. Application Data

[62] Division of Ser. No. 27,035, Apr. 4, 1979, Pat. No. 4,236,932.

[30] Foreign Application Priority Data

Apr. 7, 1978 [DE] Fed. Rep. of Germany ....... 2815161

[51] Int. Cl.³ ............................................. F27B 15/00
[52] U.S. Cl. ....................................... 432/58; 432/106
[58] Field of Search ................................... 432/58, 106

[56] References Cited

U.S. PATENT DOCUMENTS 3,884,620  5/1975  Rammler ............................. 432/58

FOREIGN PATENT DOCUMENTS 703951  2/1954  United Kingdom ................ 432/106

Primary Examiner—John J. Camby
Attorney, Agent, or Firm—Hill, Van Santen, Steadman, Chiara & Simpson

[57] ABSTRACT

A method and apparatus for the production of a hydraulic binder of the type used for plaster and masonry mortar within a cement producing installation including a preheating zone and a clinker calcining zone. In accordance with the invention, the cement producing plant is modified to the extent of providing for the removal of a predetermined portion of the material being processed from at least one point between the preheating zone and the clinker calcining zone wherein the withdrawn material has a predetermined condition of activation so that it is useful alone or in a mixture with other ingredients in the manufacture of the binder.

7 Claims, 3 Drawing Figures

METHOD AND APPARATUS FOR PRODUCING A HYDRAULIC BINDER

This is a division of application Ser. No. 027,035 filed Apr. 4, 1979, now U.S. Pat. No. 4,236,932.

BACKGROUND OF THE INVENTION

1. Field of the Invention

This invention is in the field of manufacturing hydraulic binders and involves selective withdrawal of partly processed material from a cement producing installation and further processing of the withdrawn material to make it suitable for use in a hydraulic binder composition.

2. Description of the Prior Art

The usual method for producing a hydraulic binder for use in plaster or masonry mortar utilizes a base of limestone or clay, and activates these materials thermally at temperatures between 450° and 900° C. By "activation" is meant the liberation of water of crystallization, for example, with plaster of Paris, the liberation of binding water contained in hydroxyl groups in the case of mineral clays, and the liberation of carbon dioxide, called deacidification, in the treatment of calcium carbonate.

For the production of these products, simple shaft furnaces or blast furnaces are suitable and, in some cases, relatively small rotary kilns can be used. Hydraulic binders have sometimes been produced in installations producing cement clinker by means of low combustion, if such an installation permitted the use of this type of method. Largely, such installations utilized pellets or granules as the starting materials.

In the case of other installations, for example, in the manufacture of cement clinker by the dry method which normally uses a suspension gas heat exchange system for preheating and calcination, and calcination of the mixture of the raw material as a meal, the production of such products is not feasible for technical and economical reasons. Largely this is due to the reluctance to set up a separate production installation with additional costs for the production of the hydraulic binder.

SUMMARY OF THE INVENTION

The present invention provides a suitable method and apparatus for the unrestricted production of hydraulic binders, particularly useful for plaster and masonry mortar, which avoid the necessity of setting up a special production line as well as making possible the utilization of a more or less conventional cement clinker production installation without impairing its basic or original production, and particularly without reducing its economy by varying the conditions of operation outside of the most economical range.

In accordance with the present invention, a conventional cement clinker production installation is modified to the extent of withdrawing a portion of the material being preheated between the preheating zone and the clinker calcining zone, when the withdrawn material is at a temperature of at least 450° C., the material being removed in predetermined amounts and at a predetermined state of activation.

DESCRIPTION OF THE PREFERRED EMBODIMENTS

Figure 1:
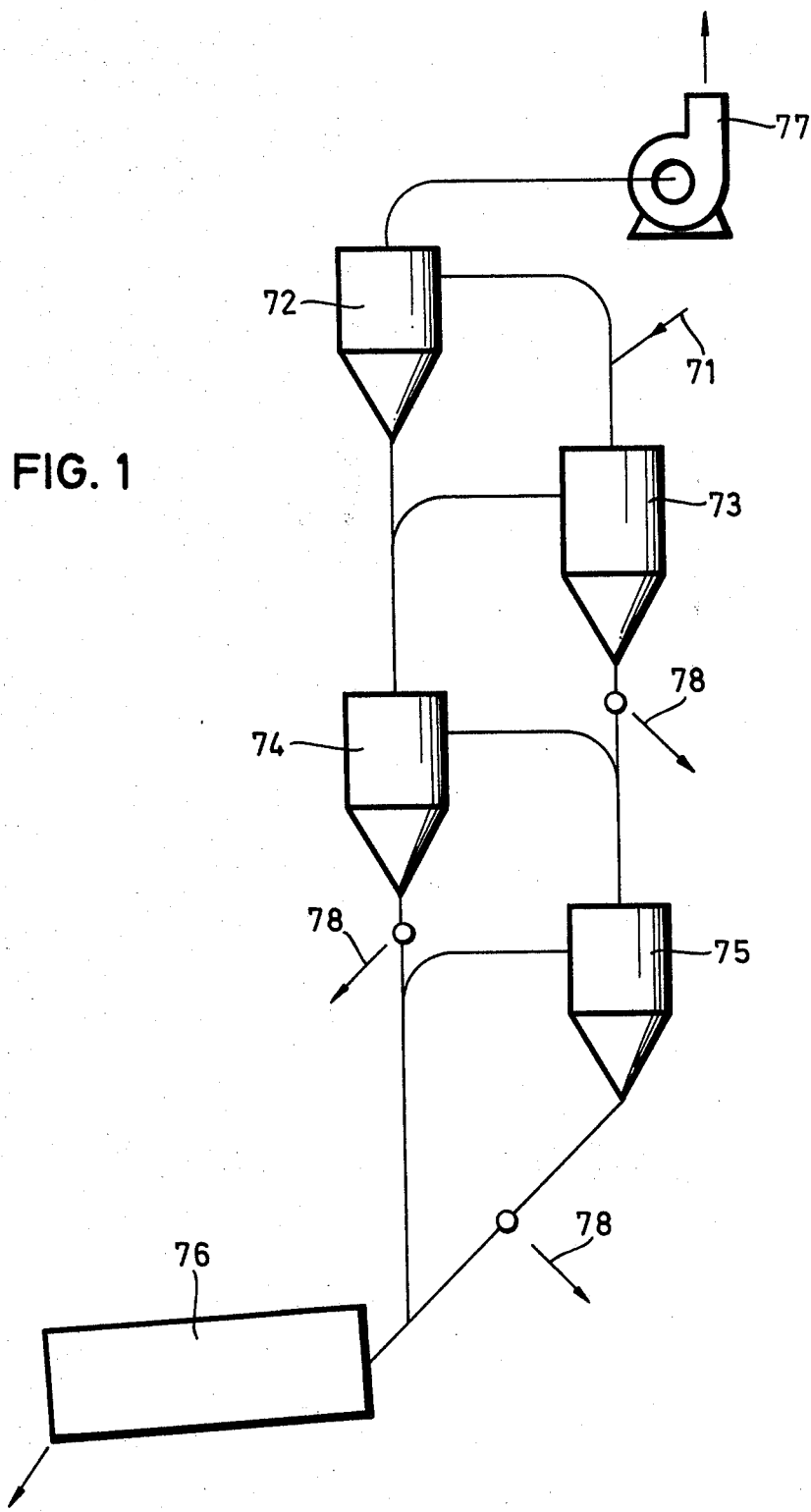
FIG. 1 is a diagrammatic showing of an installation according to the present invention.

In order that the simultaneous production of binder and cement proceed without mutual hindrance, it is advisable that, depending on the quantity removed, the input of the raw material and the heat input be correlated so that constant conditions prevail in the calcining zone.

The advantages of the present invention include the saving of a separate product line and a resultant saving of investment cost, energy cost, and operational cost, a saving in the use of heat because of the integration of the binder and cement production, and flexibility of production in that independent simultaneous production of different products can be achieved in the same installation. Transportation costs are eliminated for accumulating hydraulic binder, and there is no dependence on competitive or remote installations.

The method of the present invention may involve withdrawing preheated, partially calcined materials at two points with different degrees of activation such that upon admixture according to weight or volume, a product of predetermined condition of activation is produced. This feature provides a greater flexibility for the production capability, particularly with respect to different starting materials. For example, carbonates require a higher temperature for deacidification than mineral clays do for the liberation of the binding water present. With this form of the invention, it is possible to have correct activation temperatures for each of the mineral components produced.

In one form of the invention, the control of the heat contribution or heat balance takes place through control of the supply of fuel to the burner for the clinker calcining zone. The balancing of the heat contribution may also take place through the control of the supply of fuel in the area of the material inlet into the rotary kiln. It may also be provided by control of the supply of fuel to a second firing zone in the area of the calcination zone. The specific technique chosen will depend on the equipment and its manner of operation.

If, for example, rotary kilns are provided for the preheating, calcination, and clinker burning, then it will be advisable to increase the fuel either at the burner for the clinker zone or in the area of the material inlet into the second rotary kiln.

In an installation for the production of cement by the dry method which is equipped with a suspension gas heat exchange system and a second firing, then the heat input will be controlled largely through the fuel supply to the second firing.

Some installations recycle hot gases from the clinker cooler into the calcination zone. In this type of installation, some of the heat contribution can come from such hot gases to the places where additional heat is needed in the installation.

Because of the extensive comminution of the material which takes place before the calcination, the active surface is greatly increased and the reaction time required for the dissociation and escape of carbon dioxide is greatly shortened. Consequently, it is possible to conduct the material to be heated in countercurrent fashion through a hot gas and thereby attain a sufficient deacidification.

In accordance with the present invention, the partly treated material is removed with a degree of acidification of 50 to 85%, and preferably from 62 to 72%.

The degree of comminution used in cement production is defined by DIN (German Industry Norm) 4188. Only 20% of the particles may accordingly be so coarse as to not pass through a sieve having mesh of 0.2 mm size. The degree of comminution is substantially higher than according to an earlier suggestion (AT Specification No. 248,313) as a result of which pure limestone is comminuted before calcination in order to make possible its treatment in a rotary kiln.

Another advantage of the present invention results in the fact that the material removed can be processed further without intermediate grinding. This saves the necessity of expensive comminution of aggregates.

Another feature of the invention resides in the control whereby the rate of volume withdrawal of material is controlled by comparison with a theoretical-actual comparison at the gravimetrically determined stream of material. In this connection, the correction of quantity of raw material may be in relation to the portion of material being removed as volatile products. With this feature, there is maintained a condition of equilibrium in the streams of materials within the installation.

For the maintenance of equilibrium of the heat balance, it is necessary that the heat balance take into consideration the heat content of the material removed as well as its use of endothermic heat.

A suitable apparatus for carrying out the method of the present invention includes at least one withdrawal means between the preheating zone and the clinker calcining zone in a calcination system carried out using the dry method. It is particularly preferable that there be at least two withdrawal means arranged between the prehating zone and the clinker zone.

An apparatus of this type may also include, in the direction of through-put of material, the following elements:

(1) A dosaging discharge member;
(2) A cooling apparatus, preferably with an enclosure for infiltrated air;
(3) A device for quenching or otherwise terminating activation; and
(4) A continuous weighing device.

In one form of the present invention, a suitable arrangement of apparatus provides at least one discharge installation between individual stages of a suspension gas heat exchanger system. The discharge installation may be constructed as a material dividing point at the material output end of at least one heat exchange cyclone, and located in the area of the lowermost heat exchanger cyclone. This feature is particularly suitable when a second firing is provided in the area of the lowermost heat exchanger or between the material inlet area of a rotary kiln and a lowermost heat exchange cyclone because there results optimum flexibility of the manner of operation in the production of the two different products, cement and binder.

Another feature of the present invention provides a cooling apparatus which includes a cooling worm type conveyor, and a mixing device which is a mixing worm. These features insure a completely continuous progress of the method according to the present invention.

Finally, an improved embodiment of the present invention includes a calcination stage with individual fuel supply, whereby a discharge installation is provided in the area or at the material outlet of the calcination stage. The lowermost stage of a multistage heat exchange system may be constructed as a calcination stage in this embodiment.

A further description of the present invention will be made in greater detail on the basis of the accompanying drawings.

The device shown in FIG. 1 includes a cement calcination furnace normally in the form of a rotary kiln whose exhaust gases are supplied to a series of cyclone stages 75, 74, 73 and 72 which gases leave the installation through an exhaust gas blower 77.

In their path, the hot exhaust gases encounter a finely divided dust type starting material introduced at a material charging point 71. The starting material may consist, for example, of clays, lime marls and limestone such that in a condition free from ignition loss, about the following composition results:

| | |
|---|---|
| CaO | 60–70% by weight |
| $SiO_2$ | 18–24% by weight |
| $Al_2O_3$ | 4–8% by weight |
| $Fe_2O_3$ | 1–4% by weight |
| MgO | 0.5–5% by weight |

While the gas is passing from the fourth cyclone stage 75 up to the first cyclone stage 72 is progressively cooled, in the reverse direction a progressive heating of the charged material takes place. The gas temperatures may fluctuate in the second cyclone stage 73 between about 480° and 550° C., after the third cyclone stage 74 between 650° C. and 700° C., and after the fourth cyclone stage 75 between 780° and 850° C.

The installation described thus far corresponds substantially with conventional devices for the production of cement. In accordance with the present invention, we now provide removal points 78 after individual cyclone stages through which charged material which has been partially deacidified is removed. The portion of the material removed in relation to the total quantity may lie within wide limits depending on particular economic requirements. The degree of acidification of the removed portion in general is between 50 and 85%, and preferably between 62 and 72%. In this connection, the deacidification should be spoken of as apparent deacidification because the material removed evidences a mixture of completely deacidified dust which is conveyed along through the exhaust gases from the rotary kiln, and partially deacidified charged material whose degree of deacidification in itself varies from the average degree of deacidification determined in the removed mixture.

The material removed is first cooled and then filtered to achieve a constant volume. After the reaction which takes place in the preheater, the entire calcium oxide resulting from the deacidification of the calcium carbonate is not bound with residual components but remains free in the product. This calcium oxide must be slaked with water, that is, it must be converted into calcium hydroxide. A lime product which is not filtered from objectionable impurities, when used in the manufacture of mortar or even after hardening, shows a strong sublimation of lime with multiplication of volume, so that it does not have a constant volume and the resulting plaster may crumble and drop off, and the masonry may be disturbed.

Air-pore formers may be supplied to the filtered material in the usual manner for improving the treatability of the mixture. Suitable air-pore formers are sponified natural resins and the like as well as artificial surface active substances such as those used in the production of washing media and bath foams. Through the addition of ground cement clinker, the strength or resistance of the binder may be increased. If for the purposes intended, the proportion of calcium hydroxide is too high, then material such as ground blast furnace slag, trass (or volcanic tuff) or flue dust, may be added to improve the capacity of the end product for hydraulic hardening.

Figure 2:
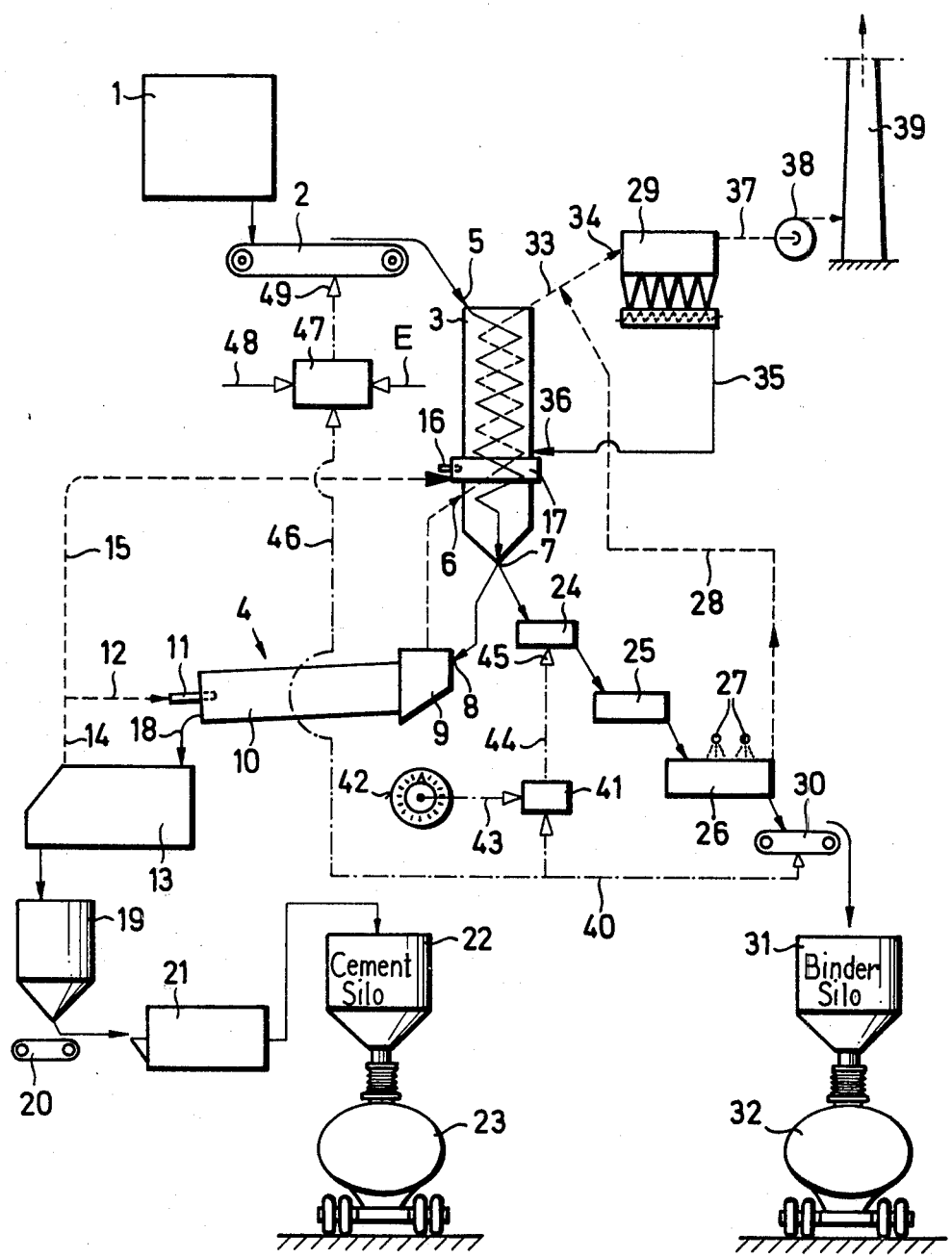
FIg. 2 is a block circuit diagram of another installation according to the invention.

Turning now to FIG. 2, an installation is illustrated in which raw meal from a raw meal homogenizing silo 1 equipped with a dynamic weighing device 2, a conveyor scale, and a preheating and calcination stage 3 is delivered to an installation for the calcination of cement clinker 4 at entry point 5. The raw material passes through the preheating and calcination stage 3 downwardly in intensive heat exchange with hot heat carrying gases which are introduced at a point 6 into the preheating and calcining stage 3. The calcined raw meal leaves the preheating and calcination stage 3 at a point 7 and is delivered to a point 8 at the material inlet 9 of a sintering stage 10. The sintering stage 10 may include a rotary kiln having a burner 11 to which hot secondary and primary air supplies 12 are supplied from a clinker cooler 13 by means of a conduit 14. A branch conduit 15 directs hot fresh air from the clinker cooler 13 to a burner 16 of a second firing stage 17 which is located within the preheating and calcination stage 3.

The completely burned clinker in a discharge line 18 is cooled and thereafter stored in a clinker silo 19. From there, the clinker is directed through a dosaging discharge member 20 in time related quantities into a grinding installation 21. The completely ground cement is brought into a storage tank 22 from which the finished product is removed by transportation vehicles 23 to be delivered to its place of use.

At the point 7, through a material separator (not shown), a portion of the preheated and calcined material is delivered to a dosaging adjusting valve or a volumetrically or gravimetrically dosaging removal apparatus 24. This material is then supplied continuously to a cooling apparatus 25, and is further delivered constantly to a filtering device 26. In the filtering device, through the addition of injected water illustrated by sprinklers 27, the material is filtered or quenched. The quenching apparatus 26 is equipped for the removal of dust by means of a conduit 28 which delivers the dust to a central dust remover installation 29.

The filtered material is delivered to a conveyor scale 30 and is removed and stored in a silo 31 from which the material can be supplied to transportation vehicle 32 for delivery to the place for further processing. Exhaust gas leaving the preheating and calcination stage 3 is delivered by means of a conduit 33 to the dust removal installation 29 which supplies dust separated from the process by means of the conduit 35 to the point 36 returning it to the process, while the purified exhaust gas is released through an exhaust gas conduit 37 and a hot gas ventilator 38 as well as a smokestack 39 into the atmosphere.

The continuous weighing device determines the actual value of the discharged material and supplied impulses proportional to the weight by means of a control conduit 40 and an electronic comparator 41. The latter receives a theoretical value impulse from a digital electronic preselector device 42 by means of a control conduit 43. The comparator 41 forms a regulating impulse from its two inputs which, by means of a signal conduit 44 provides a control signal 45 to the volumetrically dosaging removal apparatus 24. At the same time, the actual value signal is connected by means of a control conduit 46 of an electronic calculating unit 47 which also receives impulses 48 from the raw meal-theoretical value corresponding to the through-put of the sintering stage 4. Both values are added and connected as a corrected theoretical value 49 to control the dynamic weighing device 2 for the addition of raw meal.

In this way, the partial stream of partially deacidified raw meal removed at the point 7 by means of the removal apparatus 24 is provided in correct dosage without and significant time delay. Another factor corresponding to the degree of deacidification, identified by the symbol E is likewise introduced into the calculating unit 47.

Figure 3:
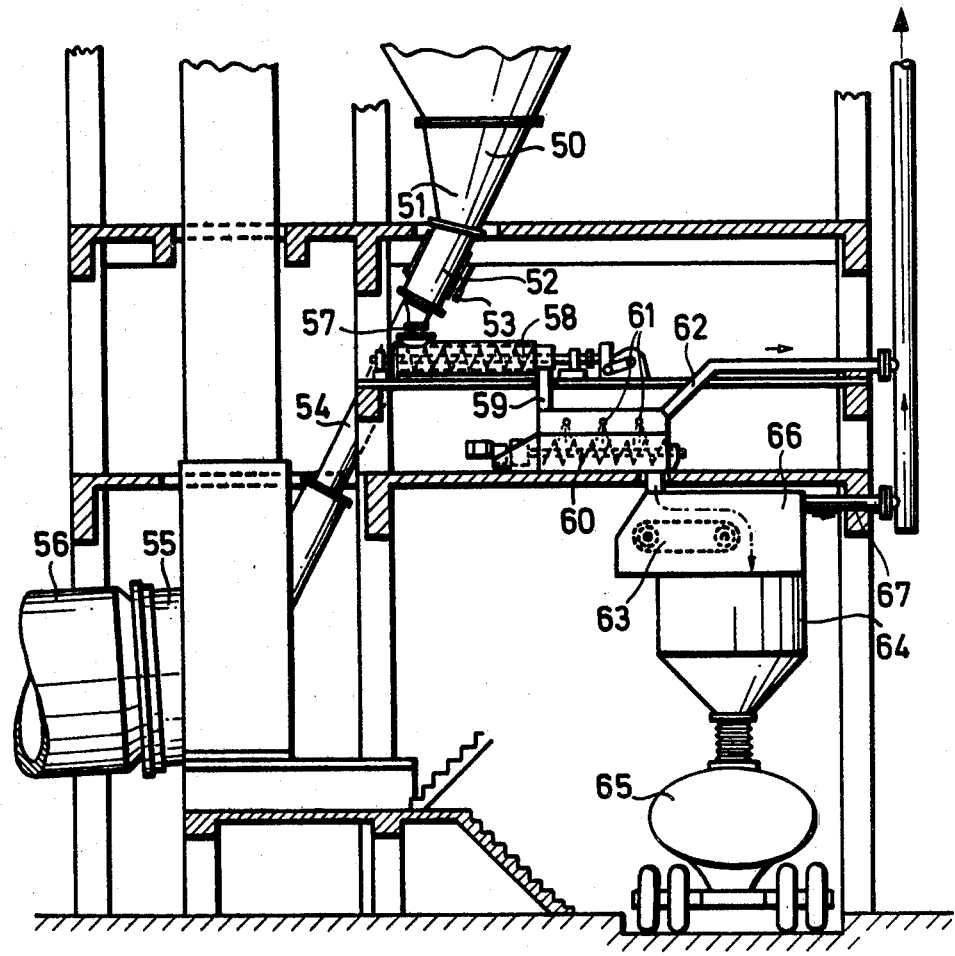
FIG. 3 is an enlarged section of an installation according to FIG. 2, in elevation.

FIG. 3 shows a fragmentary view of a specific device which can be used for the purposes of the present invention. It includes a lowermost cyclone 50 of a four-stage cyclone heat exchanger installation having a material outlet end 51. A material separator 52 is attached to the latter and is equipped with a regulating valve 53. A discharge conduit indicated by the reference character 54 directs at least the largest part of the deacidified raw meal into the material inlet side 55 of a rotary kiln which operates to sinter the material. By means of a branch conduit 57, material is supplied to a water-cooled cooling worm 58 which, in addition to cooling the material, acts as a volumetrically dosaging discharge member. The cooled material is directed into a discharge conduit 59 and into a filtering worm 60 which injects the still hot material and has nozzles 61 which direct streams of water into the material and intimately mixes the water with the hot material. There is also provided a dust removal conduit 62 attached to a suitable low pressure or vacuum system for dust removal.

From the filtering worm 60, separated material is dropped down to a gravimetrically dosaging conveyor scale 63 which delivers the material into a loading silo 64 from which the material is loaded onto trucks 65 for transportation to the place of use. The head portion 66 of the loading silo 64 serves as a hermetically dustproof lining for the transportation of the material from the filtering worm 60 through the conveyor scale 63 into the silo 64 and is provided with a dust removal attachment conduit 67 which directs the dust recovered to the central dust removal system.

The installations shown in the block circuit diagrams of FIGS. 1 and 2 and partially in detail in FIG. 3 are to be regarded as representative examples of possible embodiments of the invention. Further embodiments, which will vary from case to case with regard to the equipment used and the cement production installation can also be made within the skill of the art.

We claim as our Invention:

1. An apparatus for production of a hydraulic binder which comprises:
   means defining a preheating zone for particulate material used in the manufacture of cement, said preheating zone including a plurality of sequential stages each stage providing a progressively greater degree of deacidification to the raw material passing therethrough,
   means for introducing raw material into said preheating zone, means defining a calcining zone receiving the preheated output of said preheating zone, and
discharge means between said preheating zone and said calcining zone for withdrawing a portion of the preheated material of a predetermined degree of deacidification which is less than complete deacidification.

2. An apparatus according to claim 1 which includes:
at least two discharge means for withdrawing portions of preheated material of different degrees of deacidification from said preheating zone.

3. An apparatus according to claim 1 including the following units, in sequence, following said discharge means:
   a dosaging discharge member,
   a cooling means,
   a quenching means, and
   a continuous weighing device.

4. An apparatus according to claim 3 which includes:
   a worm type conveyor operatively positioned within said cooling means.

5. An apparatus according to claim 3 which includes:
   a mixing worm operatively positioned in said cooling means.

6. An apparatus according to claim 1 in which: said preheating zone consists of a plurality of suspension gas type heat exchangers and said discharge means is located between two of said heat exchangers.

7. An apparatus according to claim 1 in which:
   said sequential stages consist of a plurality of superposed cyclone heat exchangers, and
   means defining a calcination stage in the lowermost of said cyclone heat exchangers.

* * * * *